United States Patent [19]
Hara et al.

[11] Patent Number: 4,738,811
[45] Date of Patent: Apr. 19, 1988

[54] PROCESS FOR PRODUCING CHOLESTERIC LIQUID CRYSTAL POLYESTER FILM OR SHEET POSSESSING ORDERED PLANAR TEXTURE

[75] Inventors: Hajime Hara, Fujisawa; Shingo Orii, Kawasaki; Tetsuo Satoh, Yokohama; Tomohiro Toya, Yokohama; Shigeki Iida, Yokohama, all of Japan

[73] Assignee: Nippon Oil Company, Limited, Japan

[21] Appl. No.: 909,486

[22] Filed: Sep. 19, 1986

[30] Foreign Application Priority Data

Sep. 20, 1985 [JP] Japan ................................ 60-20654

[51] Int. Cl.$^4$ ............................................. B29C 47/88
[52] U.S. Cl. ............................... 264/211.12; 264/204; 264/235; 264/237; 264/328.14; 264/331.18; 264/331.21; 264/345; 528/176; 528/271
[58] Field of Search ............... 264/235, 237, 346, 345, 264/331.18, 331.21, 211.12, 211.14, 176.1, 235.6, 328.14, 204; 528/176, 271, 194

[56] References Cited

U.S. PATENT DOCUMENTS

| 4,325,903 | 4/1982 | Wissbrun et al. | 264/176.1 |
| 4,332,759 | 6/1982 | Ide | 264/211.14 |
| 4,410,683 | 10/1983 | Gale | 264/211.14 |
| 4,429,104 | 1/1984 | Feasey | 264/235.6 |
| 4,468,364 | 8/1984 | Ide | 264/211.12 |
| 4,508,891 | 4/1985 | Bailey et al. | 264/237 |
| 4,529,565 | 7/1985 | Kasatani et al. | 264/211.12 |

FOREIGN PATENT DOCUMENTS

| 58-53418 | 3/1983 | Japan | 264/176.1 |
| 58-90934 | 5/1983 | Japan | 264/331.21 |

Primary Examiner—Jeffery Thurlow
Attorney, Agent, or Firm—Scully, Scott, Murphy & Presser

[57] ABSTRACT

A process for producing a cholesteric liquid crystal polyester film or sheet possessing an ordered planar texture (monodomain structure), which process comprises providing a cholesteric liquid crystal polyester in which 1 to 10 mol % of constituent monomer units are optically active, allowing the cholesteric liquid crystal polyester to be formed in the temperature range of 150° to 350° into a film or sheet having a thickness not larger than 100 μm, and then cooling the film or sheet rapidly.

5 Claims, No Drawings

PROCESS FOR PRODUCING CHOLESTERIC LIQUID CRYSTAL POLYESTER FILM OR SHEET POSSESSING ORDERED PLANAR TEXTURE

BACKGROUND OF THE INVENTION

The present invention relates to a process for producing a cholesteric liquid crystal polyester film or sheet having a high strength, a high modulus and a good dimensional stability.

Recently, with the reduction in size and thickness of magnetic tapes and discs, there has been an increasing demand for a film or sheet superior in strength, modulus and dimensional stability.

In order to obtain a thin film or sheet having a high strength and a high modulus it is necessary to orient a polymer molecular chain biaxially, and the method adopted most commonly for realizing such biaxial orientation is a biaxial drawing. However, biaxial drawing is not only costly high but also encounters a limit in attainable strength and modulus because a biaxial drawing condition is rather restricted. Also in point of dimensional accuracy a drawn film is prone to shrink on heating.

One means for overcoming the above problems that has been proposed is a biaxially self-reinforced cholesteric liquid crystal polymer (U.S. Pat. No. 4,412,059).

In a cholesteric liquid crystal polymer, a nematic liquid crystal layer is induced by an optically active unit to form a helical structure twisted at a certain angle. In the case of a cholesteric liquid crystal polymer having a rigid chain and an optically active unit copolymerized in the main chain, it is expected that there will be obtained a film or sheet which is self-reinforced biaxially like a laminate.

However, in a cholesteric liquid crystal polymer, unlike a low molecular liquid crystal, orientation is so slow that it is rarely the case that the entire film or sheet is composed of an ordered planar texture in which all the cholesteric helical axes are perpendicular to a plane (monodomain state). Usually, a cholesteric polymer film or sheet is composed of a large number of small planar texture (polydomain structure) similar to a polycrystal structure (see Tadahiro Asada, "Kobunshi Kako," 32, 79 (1983), 33, 119 (1983)).

Actually, in thermotropic cholesteric liquid crystal polyesters with high molecular weight, it is not easy to observe such a texture as oily streaks or a fingerprint pattern when they are in a molten condition. Further, there has been no reporting of an ordered planar texture (monodomain structure) when these liquid crystal polyesters are frozen in a film or sheet.

In a film of a polydomain structure, the anisotropy of mechanical properties caused by the flow during molding is reduced, but since mechanical properties are governed by tiemolecules between domains, it is impossible to make the most of the high strength and high modulus of liquid crystal polymers. On the other hand, in the case of a film having a monodomain structure or a structure similar thereto, because of a layer structure parallel to a plane throughout the whole surface of the film, not only is the anisotropy of mechanical properties reduced but also it is possible to realize the high strength and high modulus peculiar to liquid crystal polymers.

Therefore, the development of a technique for attaining a monodomain structure of cholesteric liquid crystal polyesters has been desired.

SUMMARY OF THE INVENTION

The present invention relates to a process for fixing an ordered planar texture (monodomain structure) or a laminate structure akin to monodomain structure in a cholesteric liquid crystal polyester film or sheet.

More particularly, the present invention resides in a process for producing a cholesteric liquid crystal polyester film or sheet possessing an ordered planar texture (monodomain structure), characterized by providing a cholesteric liquid crystal polyester in which 1 to 10 mol% of constituent monomer units are optically active allowing the cholesteric liquid crystal polyester to be formed in the temperature range of 150° to 350° C., into a film or sheet having a thickness not larger than 100 $\mu$m, and then cooling the film or sheet rapidly.

DETAILED DESCRIPTION OF THE INVENTION

The cholesteric liquid crystal polyester used in the present invention is prepared by copolymerizing an optically active component with a nematic or smectic liquid crystal polyester. Such nematic or smectic liquid crystal polyester usually contains the following structural unit as mesogen:

As structural unit derived from aromatic diol:

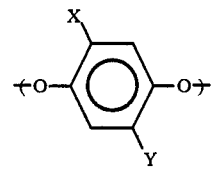

wherein X and Y are each independently hydrogen, halogen, or an alkyl group having not more than four carbon atoms;

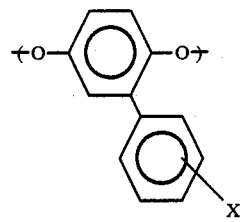

wherein X is hydrogen, halogen, or an alkyl group having not more than four carbon atoms;

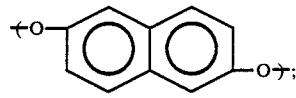

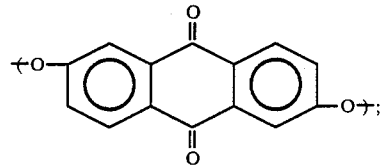

-continued

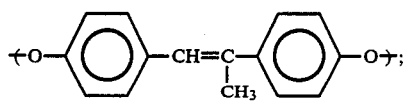

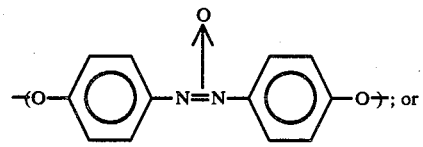

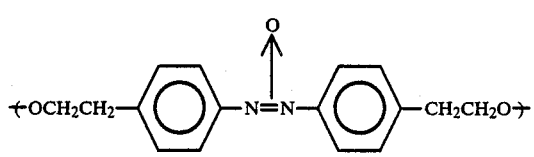

As structural unit derived from aromatic dicarboxylic acid or cyclohexanedicarboxylic acid:

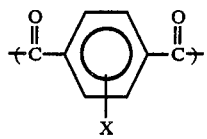

wherein X is as defined above;

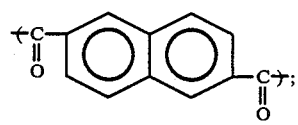

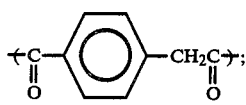

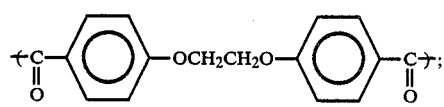

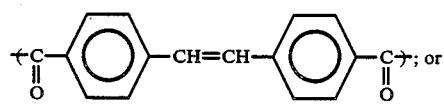

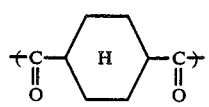

As structural unit derived from aromatic hydroxycarboxylic acid:

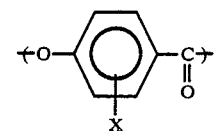

wherein X is as defined above;

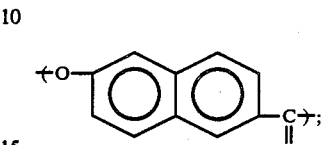

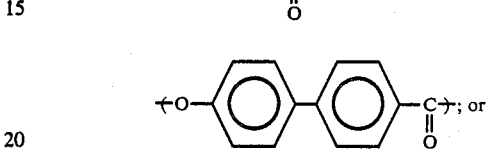

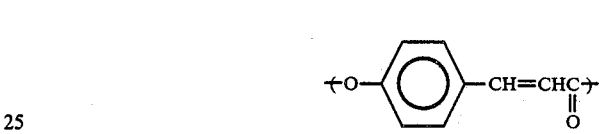

The cholesteric liquid crystal polyester is obtained by copolymerizing an optically active component with the aromatic polyester containing such structural unit as mesogen. As the optically active component there is used an optically active substance copolymerizable with such structural unit. Particularly, bifunctional compounds are preferred in that they can be introduced in any desired amount into the polymer chain. Even monofunctional compounds capable of being introduced only in polymer ends are also employable if they exhibit a cholesteric liquid crystal mesophase.

Examples of bifunctional optically active monomers include (R)- or (S)-dicarboxylic acids such as 3-methyladipic acid and benzoylglutamic acid; (R)- or (S)-diols such as 1,2-propanediol and 2-methyl-1,4-butanediol; and (R)- or (S)-hydroxycarboxylic acids such as 3-hydroxybutanoic acid and 2-methyl-3-hydroxypropionic acid. These may be used each alone or as a mixture in the copolymerization. Optical purity need not always be 100%, but in the case of a mixture of (R) and (S) isomers a helical pitch in cholesteric liquid crystal becomes larger than that from a pure (R) or (S) isomer and the cholesteric mesophase forming above is deteriorated. Generally, the difference in content between (R) and (S) isomers should be not less than 15%, preferably not less than 30%. As to the amount of the optically active component to be introduced, it will be described in detail later in connection with how to realize the monodomain structure.

In the cholesteric liquid crystal polyester of the present invention there may be introduced the following units for adjusting the melting point.

Monomer units such as m-substituted benzene derivatives and 2,7-substituted naphthalene derivatives, for example:

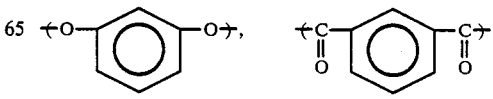

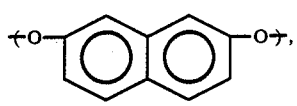

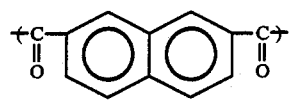

Monomer units containing a freely rotatable group between aromatic rings such as:

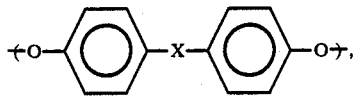

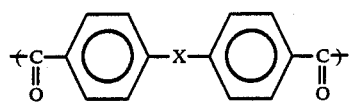

wherein X is O, CH$_2$, C(CH$_3$)$_2$, or SO$_2$.

Units derived from aliphatic diols and aliphatic dicarboxylic acids represented by the general formulae:

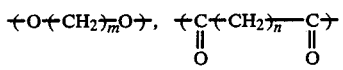

wherein m and n are each an integer of 2 to 12.

The cholesteric liquid crystal polyester of the present invention can be prepared by a known method. For example, a diacid chloride condenses with a diol while allowing dehydrochlorination to take place; a dicarboxylic acid dimethyl ester or diphenyl ester condenses with a diol at a high temperature and reduced pressure (e.g. 1 mmHg or less; a dicarboxylic acid compound condenses with a diacetylated diol at a high temperature and reduced pressure (e.g. 1 mmHg or less); or a dicarboxylic acid compound condenses directly with a diol in the presence of a condensing agent such as a phosphorus compound. In the case of using a hydroxycarboxylic acid compound with the monomers mentioned above, it is possible to perform a copolymerization in accordance with the above polymerization method.

In the cholesteric liquid crystal polyester of the present invention, it is essential that 1 to 10 mol% of constituent monomer units are optically active. If the proportion of the optically active monomer is outside the above range, it will be impossible to obtain an ordered planar texture (monodomain structure) as will be described later.

After maintaining the cholesteric liquid crystal polyester in the temperature range of 150° to 350° C., preferably 200° to 300° C. to exhibit liquid crystal state, the cholesteric liquid crystal polyester of the present invention is formed into a film or sheet having a thickness not larger than 100 μm. If the thickness is larger than 100 μm, an ordered planar texture (monodomain structure) will not be obtained.

As the processing method there is adopted, for example, extrusion, injection molding, or melt pressing. When shear stress is applied during the process, aging in the temperature range of 150° to 350° C. (liquid crystal forming temperature region) is preferably adopted to form an ordered planar texture (monodomain structure).

Alternatively, an ordered planar texture (monodomain structure) may be attained by dissolving the cholesteric liquid crystal polyester in a solvent, then forming the resulting solution into a film by means of a roll coater or by any other suitable means, then allowing the solvent to volatilize, followed by melting in the liquid crystal forming temperature region.

It is presumed that whether the helical axes of cholesteric liquid crystal are oriented perpendicularly to the film or sheet surface, is greatly influenced by the surface conditions during molding. Since a polyimide film permits an easy orientation of molecular chain in parallel with the surface thereof, and also exhibits superior heat resistance, it can be considered to be a preferable material.

For freezing the cholesteric planar texture on the film or sheet, it is necessary to effect a rapid cooling from the liquid crystal forming temperature region down to a temperature below the polymer melting point (or below the Tg temperature if the polymer does not have a melting point). In the case where a slow cooling is adopted, there may occur relaxation resulting in disorder of orientation, or crystallization may take place with the result that it is no longer possible to maintain the ordered cholesteric planar texture.

The film or sheet thus obtained according to the process of the present invention can be further enhanced in strength and modulus by subjecting it to a heat treatment in a known manner. Moreover, like polyester films, there may be added a drawing operation.

As set forth above, the present invention is based on the finding that an ordered cholesteric planar texture is attainable only when a specific cholesteric liquid crystal polyester is subjected to molding or processing under specific conditions. Outside such specific conditions in the present invention it would be impossible to attain an ordered cholesteric planar texture.

Although the reason why an ordered cholesteric planar texture is obtained when the conditions in the present invention are satisfied, is not clear, it is presumed that the larger cholesteric helical pitch length is, the more the movement of cholesteric liquid crystal is restricted in a narrow space of the film or sheet during the melt processing. That would make helical axes to orient perpendicularly to a plane easily, so that polydomains grow into monodomain which might be stable in point of interfacial energy. Therefore, if the proportion of the optically active monomer unit is larger than 10 mol% of the total monomer units, the cholesteric helical pitch length becomes too short and so an ordered cholesteric planar texture is no longer obtainable. Even if the proportion of the optically active monomer unit is not larger than 10 mol%, an ordered cholesteric planar texture is not obtained, either, if the thickness of a film or sheet formed from the cholesteric liquid crystal polyester is larger than 100 μm.

On the other hand, if the proportion of the optically active monomer unit is smaller than 1 mol%, the cholesteric liquid crystal will exhibit properties close to the properties of nematic liquid crystal and the formation of an ordered cholesteric planar texture is no longer possible.

In the present invention, when a polydomain structure of a film or sheet observed under a crossed nicol occupies not more than 50% of the total film area, this is here defined as "an ordered planar texture (monodomain structure)". If the helical axis of cholesteric liquid crystal is perpendicular to the film or sheet plane and the cholesteric laminate structure spreads throughout the whole surface of the film like an ideal single crystal, the film or sheet will look uniformly colored when observed through a polarizing microscope under a crossed nicol. Actually, in many cases there remains an interface between domains and there exists desclination lines at which the direction of molecular chain orientation changes abruptly, so that there often appears a texture such as only streaks or a fingerprint pattern caused by inclination of the helical axis. Thus a very complicated phenomenon is observed. But an advanced state of uniting of polydomains is also here defined as an ordered planar texture (monodomain structure). On the other hand, when constituent domains of a cholesteric liquid crystal are so small in size and helical axes are randomly oriented in a film (polydomain structure), a gathering of fine crystals is observed through a polarizing microscope under a crossed nicol.

In making a film or sheet from the cholesteric liquid crystal polyester according to the process of the present invention, the cholesteric helical axes are approximately perpendicular to the film plane in the case where the polydomain structure occupies not more than 50%. This has been proved from a scanning electron micrograph observation of a fractured film surface. This ordered planar texture film has transparency because of a reduced scattering of light at the domain boundary.

The following examples are given to further illustrate the present invention.

EXAMPLE 1

15.55 g of polyethylene terephthalate having an inherent viscosity ($\eta$inh) of 0.37 dl/g as measured at 30° C. at a concentration of 0.5 wt.% using a mixed solvent of phenol/tetrachloroethane (60/40 by weight), ($\eta$inh values reported hereinafter have also been obtained by this measuring method), 34.02 g of p-acetoxybenzoic acid, 4.33 g of (R)-3-methyladipic acid and 5.24 g of diacetylate dhydroquinone (the proportion of the (R)-3-methyladipic acid as an optically active monomer being 6.7 mol% of the total monomer units) were charged into a polymerization flask equipped with a stirrer. After purging with nitrogen, the polymerization flask was placed in an oil bath held at 220° C. and reaction was allowed to take place for 1 hour in a nitrogen atmosphere under stirring, then the temperature was raised to 230° C. and reaction was allowed to take place for another one hour. At 230° C. nitrogen was started to flow and after reaction for 1 hour, a further reaction was allowed to take place under a reduced pressure for 1 hour. Then the reaction temperature raised from 230° C. to 270° C. over a period of about 30 minutes. At 270° C. the pressure was held at a vacuum degree of 0.2 mmHg for 1 hour to complete the polymerization. Yield 93%, $f$inh=0.45 dl/g.

1 g of the polymer powder held between polyimide films was placed in a central part of a 18 cm long by 5 cm wide molding aluminum plate (permitting only a longitudinal flow), then heated to 250° C. and pressed, then allowed to stand for 5 minutes in a pressurized state, followed by cooling with iced water for an instant, to obtain a film having a thickness of about 30 $\mu$m. This film was highly transparent and was uniformly colored when observed at a 50×magnification using a polarizing microscope under a crossed nicol. An opaque portion was observed in an extremely limited area at an end portion of the film and it looked like a gathering of fine crystals. Thus a slight incorporation of polydomain structure was confirmed, but its area was not more than 5%. This film was fractured at a liquid nitrogen temperature and the resulting fractured surface was observed using a scanning electron microscope; as a result, it proved to be filled with a laminate structure in parallel with the film surface. From the wavelength of maximum reflectivity of this film of 1,230 nm and a refractive index thereof of about 1.5, a pitch length P=820 nm was obtained by the following equation:

$$\lambda_o = nP$$

where, $\lambda_o$: wavelength of maximum reflectivity n: average refractive index P: pitch length of the cholesteric liquid crystal helical axis Further, from an electron microscope observation, an inter-layer distance of the laminate structure was found to be 630 nm,, approximately equal to P/2. Thus there was confirmed the presence of a cholesteric laminate structure in which the helical axis was perpendicular to the film surface and which was akin to monodomain structure.

A test piece was taken out from this film and measured for mechanical properties. Results of the measurement will be shown in the Table below.

EXAMPLE 2

Polymerization was performed in the same way as in Example 1 except that the amounts of polyethylene terephthalate, p-acetoxybenzoic acid, (R)-3-methyladipic acid and diacetylated hydroquinone were changed to 7.68 g, 32.40 g, 3.20 g and 3.84 g, respectively, (the proportion of the optically active monomer was 6.7 mol% of the total monomer units), to obtain a polymer of $\eta$inh=0.48 dl/g in 87% yield. Then a film having a thickness of 30 $\mu$m was formed from this polymer at 290° C. under the same conditions as in Example 1. It was transparent, and when observed through a polarizing microscope under a crossed nicol, it proved to be colored throughout the whole surface thereof. The presence of a polydomain structure was not recognized.

From a fractured surface of the film there was recognized the formation of a laminate structure throughout the whole surface of the film when observed using a scanning electron microscope. Mechanical properties of the film will be shown in the Table below.

EXAMPLE 3

Polymerization was performed in the same way as in Example 1 except that the amounts of polyethylene terephthalate, p-acetoxybenzoic acid, (R)-3-methyladipic acid and diacetylated hydroquinone were changed to 8.23 g, 18.00 g, 1.14 g and 1.39 g, respectively, (the proportion of the optically active monomer was 3.6 mol% of the total monomer units), to obtain a polymer of $\eta$inh=0.62 dl/g in 86% yield. Then a film having a thickness of 25 $\mu$m was formed from this polymer at 270° C. under the same conditions as in Example 1. It was substantially transparent, and when observed through a polarizing microscope under a cross nicol, it proved to be colored uniformly throughout the whole surface thereof although the surface was dotted with an extremely small quantity of fine crystals.

From a fractured surface of the film there was recognized the formation of a laminate structure throughout the whole surface of the film when observed using a scanning electron microscope. But a somewhat disordered portion was also observed. Mechanical properties of the film will be shown in the Table below.

EXAMPLE 4

10.84 g of cyclohexanedicarboxylic acid, 1.12 g of (R)-3-methyladipic acid and 16.00 g of diacetylated chlorohydroquinone (the proportion of the optically active monomer being 5.0 mol% of the total monomer units) were charged into a polymerization flask equipped with a stirrer and polymerization was performed under the same conditions as in Example 1 to obtain a polymer of $\eta inh=1.20$ dl/g in 90% yield. Then a film having a thickness of about 25 $\mu$m was formed from this polymer at 270° C. under the same conditions as in Example 1. It was substantially transparent, and when observed through a polarizing microscope under a crossed nicol, it looked uniformly colored throughout the whole surface thereof although the surface was dotted with an extremely quantity of fine crystals.

From a fractured surface of the film there was recognized the formation of a laminate structure throughout the whole surface of the film when observed using a scanning type electron microscope. But a somewhat disordered portion was also present. Mechanical properties of the film will be shown in the Table below.

EXAMPLE 5

The polymer prepared in Example 2 was dissolved in p-chlorophenol to give a 10% solution. This solution was applied onto a polyimide film by means of a roll coater and the solvent was volatilized first at room temperature, then at about 100° C. Then, heat was applied at 290° C. for 5 minutes to cause melting, followed by cooling with iced water for an instant, to obtain a transparent film having a thickness of about 10 $\mu$m. When this film was observed through a polarizing microscope under a crossed nicol, there was scarcely recognized a polydomain structure.

COMPARATIVE EXAMPLE 1

The polymer prepared in Example 1 was formed into a film having a thickness of about 140 $\mu$m under the same conditions as in Example 1 except that the spacer thickness was changed. This film, having little transparency, proved to have a polydomain structure as a gathering of fine crystals when observed using a polarizing microscope. Mechanical properties thereof will be shown in the Table below.

COMPARATIVE EXAMPLE 2

Polymerization was conducted under the same conditions as in Example 1 except that the amounts of polyethylene terephthalate, p-acetoxybenzoic acid, (R)-3-methyladipic acid and diacetylated hydroquinone were changed to 5.76 g, 12.60 g, 4.81 g and 5.82 g, respectively, (the proportion of the optically active monomer was 15.8 mol% of the total monomer units), to obtain a polymer of $\eta inh=0.69$ dl/g in 81% yield. Then a film having a thickness of 30 $\mu$m was formed from this polymer under the same conditions as in Example 1. Although the film exhibited a bright cholesteric color, it was opaque, and when observed through a polarizing microscope under a crossed nicol, it proved to have a polydomain structure.

When a fractured surface of the film was observed using a scanning electron microscope, there was not recognized a laminate structure at all. Mechanical properties of the film will be shown in the Table below.

COMPARATIVE EXAMPLE 3

Polymerization was conducted under the same conditions as in Example 4 except that the amounts of cyclohexanedicarboxylic acid and (R)-3-methyladipic acid were changed to 8.43 g and 3.36 g, respectively, (the proportion of the optically active monomer was 15.0 mol% of the total monomer units), to afford a polymer of $\eta inh=1.18$ dl/g in 90% yield. Then a film having a thickness of about 35 $\mu$m was formed from this polymer under the same conditions as in Example 1. Although the film exhibited a beautiful cholesteric color, it was opaque, and when observed through a polarizing microscope under a crossed nicol, it proved to have a polydomain structure.

When a fractured surface of the film was observed using a scanning electron microscope, there was not recognized a laminate structure at all. Mechanical properties of this film will be shown in the Table below.

COMPARATIVE EXAMPLE 4

A nematic liquid crystal polyester (T20/60, $\eta inh=0.65$ dl/g) prepared from polyethylene terephthalate and p-acetoxybenzoic acid, a product of Eastman Kodak Co., was formed into a film having a thickness of about 30 $\mu$m at 270° C. under the same conditions as in Example 1. This film, having no transparency, proved to have a polydomain structure when observed using a polarizing microscope. Mechanical properties of the film are as set out in the Table below.

TABLE

|  | Optically Active Monomer (mol %) | Film Thickness ($\mu$m) | Domain Structure | Mechanical Properties of Film | |
|---|---|---|---|---|---|
|  |  |  |  | Tensile(Note) Modulus (GPa) | Tensile Modulus Flow direction/ Transverse direction Ratio |
| Example 1 | 6.7 | 30 | ordered planar texture (monodomain) | 8.5 | 1.5 |
| Example 2 | 6.7 | 30 | ordered planar texture (monodomain) | 9.5 | 1.3 |
| Example 3 | 3.6 | 25 | ordered planar texture (monodomain) | 8.4 | 1.5 |
| Example 4 | 5.0 | 25 | ordered planar texture (monodomain) | 7.8 | 1.3 |
| Comparative Example 1 | 6.7 | 140 | disordered texture (polydomain) | 3.1 | 1.8 |

TABLE-continued

| | Optically Active Monomer (mol %) | Film Thickness (μm) | Domain Structure | Mechanical Properties of Film | |
|---|---|---|---|---|---|
| | | | | Tensile(Note) Modulus (GPa) | Tensile Modulus Flow direction/ Transverse direction Ratio |
| Comparative Example 2 | 15.8 | 30 | disordered texture (polydomain) | 4.5 | 1.5 |
| Comparative Example 3 | 15.0 | 35 | disordered texture (polydomain) | 4.3 | 1.5 |
| Comparative Example 4 | 0 | 30 | nematic (polydomain) | 4.8 | 2.7 |

(Note)Modulus exhibited when tension is applied in the molding flow direction.

From the above table it is seen that cholesteric liquid crystal polyester films obtained according to the process of the present invention have a laminate structure akin to an ordered planar texture (monodomain structure) and that as to their mechanical properties, not only a reduced anisotropy is attained, but also the high strength and high modulus of liquid crystal polymers are retained. The values shown are equal or superior to those of a biaxially drawn polyethylene terephthalate film.

What is claimed is:

1. A process for producing a cholesteric liquid crystal polyester film or sheet possessing an ordered plannar texture (monodomain structure), which process comprises providing a cholesteric liquid crystal polyester in which 1 to 10 mol% of constituent monomer units are optically active, allowing the cholesteric liquid crystal polyester to be formed in the temperature range of 150° to 350° C. into a film or sheet having a thickness not larger than 100 um, and then cooling the film or sheet rapidly, said cholesteric liquid crystal polyester comprising (A) two or more structural units selected from (a) a structural unit derived from an aromatic diol, (b) a structural unit derived from an aromatic dicarboxylic acid or a cyclohexanedicarboxylic acid and (c) a structural unit derived from an aromatic hydroxycarboxylic acid and (B) an optically active component.

2. A process as set forth in claim 1, wherein said processing is carried out by extrusion, injection molding, or pressing.

3. A process as set forth in claim 1, wherein said cholesteric liquid crystal polyester is formed into the film or sheet at a temperature in the range of 150° to 350° C. and said temperature range is maintained for a period of time sufficient to transform polydomain structure into monodomain structure, followed by cooling rapidly.

4. A process as claimed in claim 1, wherein the optically active component is a monomer selected from 3-methyladipic acid, benzoylglutamic acid, 1,2-propanediol, 2-methyl-1,4-butanediol, 3-hydroxybutanoic acid and 2-methyl-3-hydroxypropionic acid.

5. A process as claimed in claim 1 or claim 4, wherein the difference in content between (R) and (S) isomers of the optically active component is not less than 15%.

* * * * *

UNITED STATES PATENT AND TRADEMARK OFFICE
CERTIFICATE OF CORRECTION

PATENT NO. : 4,738,811

DATED : April 19, 1988

INVENTOR(S) : Hajime Hara, et al.

It is certified that error appears in the above-identified patent and that said Letters Patent is hereby corrected as shown below:

```
Column 1, line 21:  delete "high"
Column 6, line 63:  insert --polyester-- after "crystal"
Column 7, line 43:  "diacetylate dhydroquinone" should read --diacylated hydroquinone--
Column 7, line 59:  "finh" should read --ηinh--
Column 9, line 23:  insert --small-- after "extremely"
```

Signed and Sealed this

Twenty-fourth Day of January, 1989

Attest:

DONALD J. QUIGG

Attesting Officer

Commissioner of Patents and Trademarks